July 26, 1932.  S. S. GUY  1,868,827
MOTOR VEHICLE
Filed June 24, 1930  6 Sheets-Sheet 3
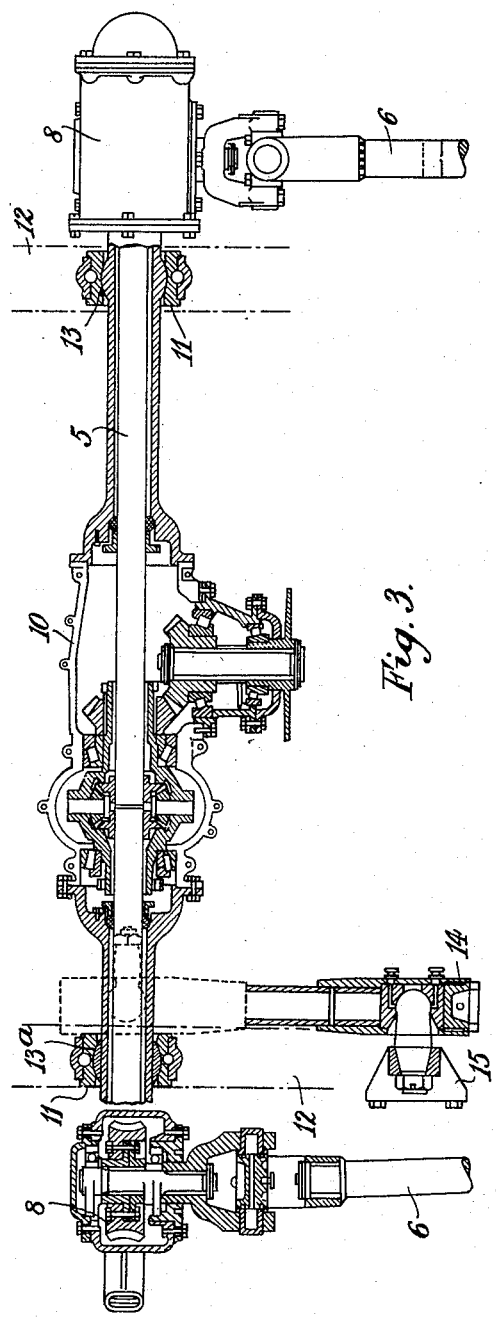
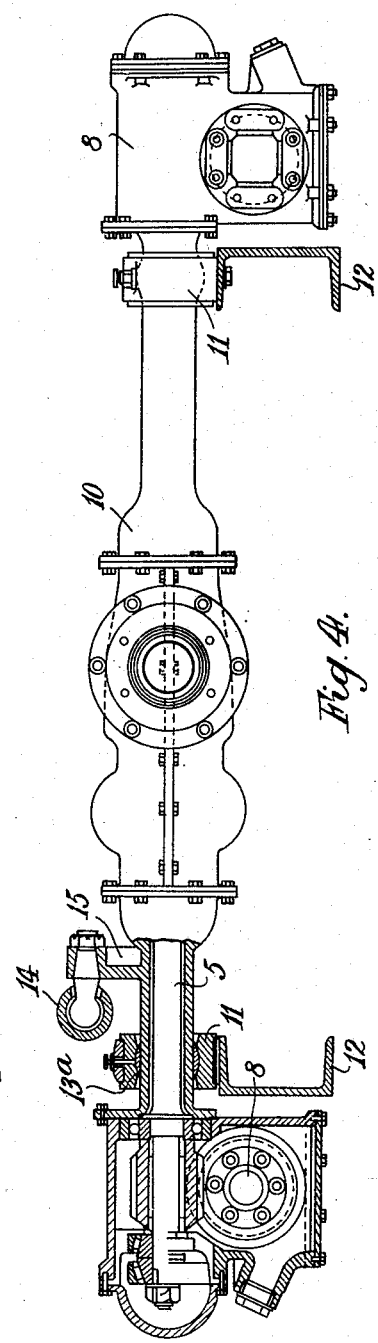
INVENTOR
Sydney S. Guy
by Richard E. Babcock
Attorney

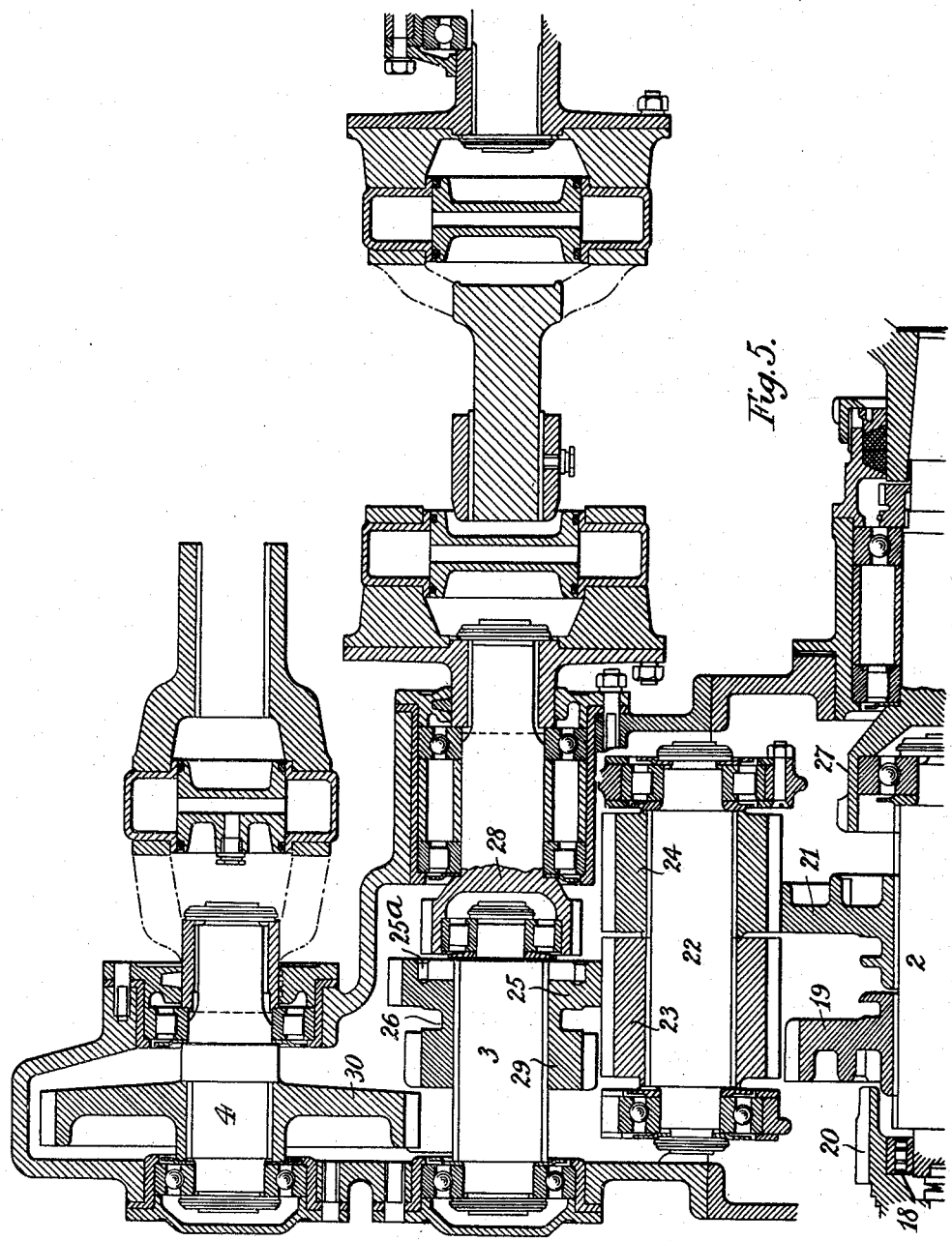

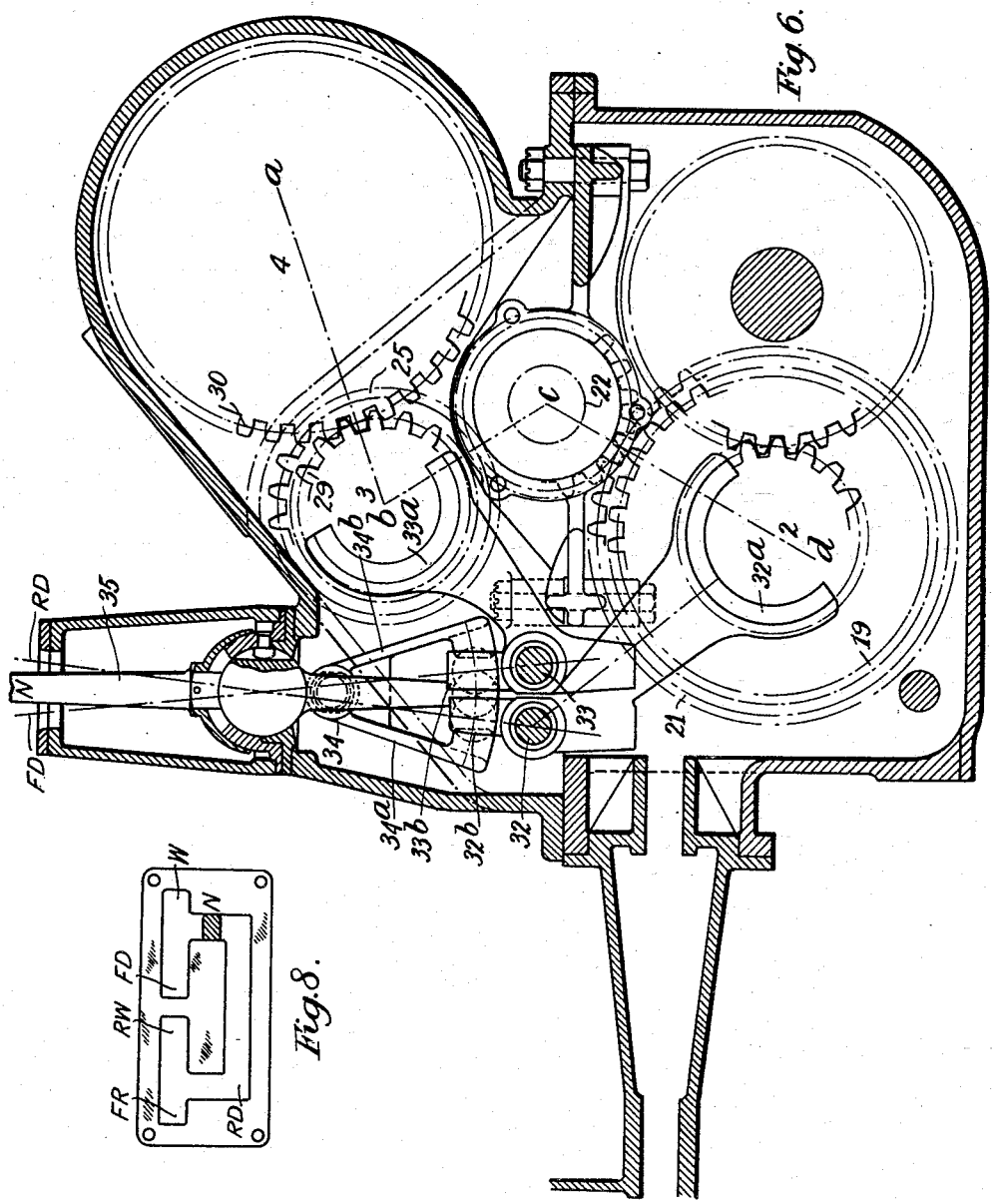

Patented July 26, 1932

1,868,827

UNITED STATES PATENT OFFICE

SYDNEY SLATER GUY, OF WOLVERHAMPTON, ENGLAND

MOTOR VEHICLE

Application filed June 24, 1930, Serial No. 463,456, and in Great Britain July 19, 1929.

This invention is more particularly applicable to heavy road vehicles for service where, as in difficult cross-country work and for other purposes it is desired to take the utmost advantage of the power available at the engine shaft both for the purposes of obtaining an increased tractive effort and for purposes unconnected with the propulsion of the vehicle itself.

The invention relates more especially to motor vehicles of the multi-driven type, that is to say, of the type in which there is a front as well as a rear drive and in which there may be either one or more front axles and one or more rear axles, all or one or more only of which in either case are driving axles.

The object of the present invention is to provide for vehicles of the kind referred to means whereby the following drives or combinations of drive may be readily obtained, viz:—

(a) Rear drive only.
(b) Front drive only.
(c) Front and rear drives simultaneously.
(d) Power take-off only.
(e) Power take-off with vehicle in motion.
(f) Rear side-shaft drive with above change-drive system.

The invention as will be understood, involves the provision between the engine shaft and the several drives of mechanism so constructed, arranged and controlled that the transmitted power can be taken by any one or more or all of several different driving systems. The said mechanism may include in addition to the customary variable speed gear a change-drive or power distribution gear, as it may be called, whereby the driver can change, not only the gear ratio in the usual way, but also the system of driving at will by the simple manipulation of a single lever. He can, for example concentrate the whole of the available power at varying speeds either on the rear wheel or wheels, or on the front wheel or wheels or he can, when circumstances require it, distribute the power between the front and the rear driving systems. He can also avail himself of the power of the engine at the varying speeds provided by the usual type of variable speed gear for the purpose of driving a winch or for any other purpose where a power take-off is desired and this, whether the vehicle is stationary or being driven.

In order that the invention may be clearly understood and readily carried into practical effect, reference is made in further describing the same to the accompanying drawings, wherein, Figures 1 and 2 are side and plan views respectively of the chassis of a motor vehicle embodying the present invention.

Figures 3 and 4 are sectional plan and rear views respectively of the cross-shafts.

Figure 5 is a longitudinal sectional view of the change-drive gear box on the line $a$, $b$, $c$, $d$, of Figure 6.

Figure 6 is a transverse sectional view of the same showing the striking mechanism.

Figure 8 represents a plan of the gate for the change-drive gear lever.

Throughout the drawings like parts are designated by similar reference characters.

Figure 1:
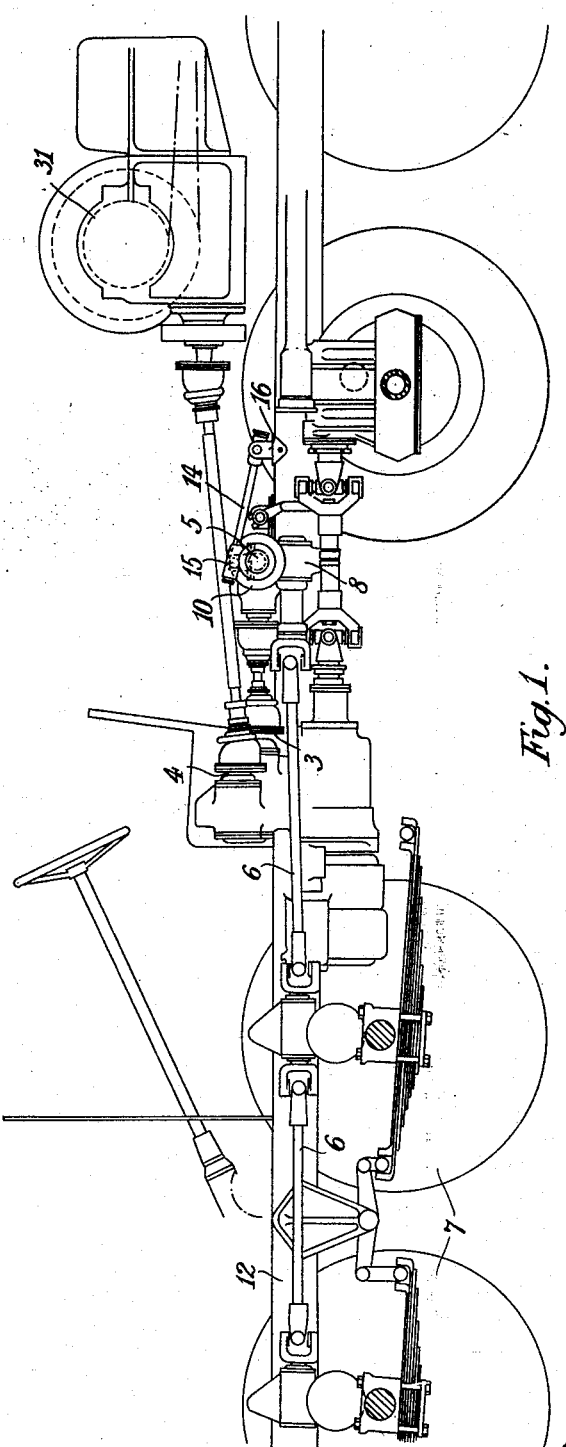
Figure 2:
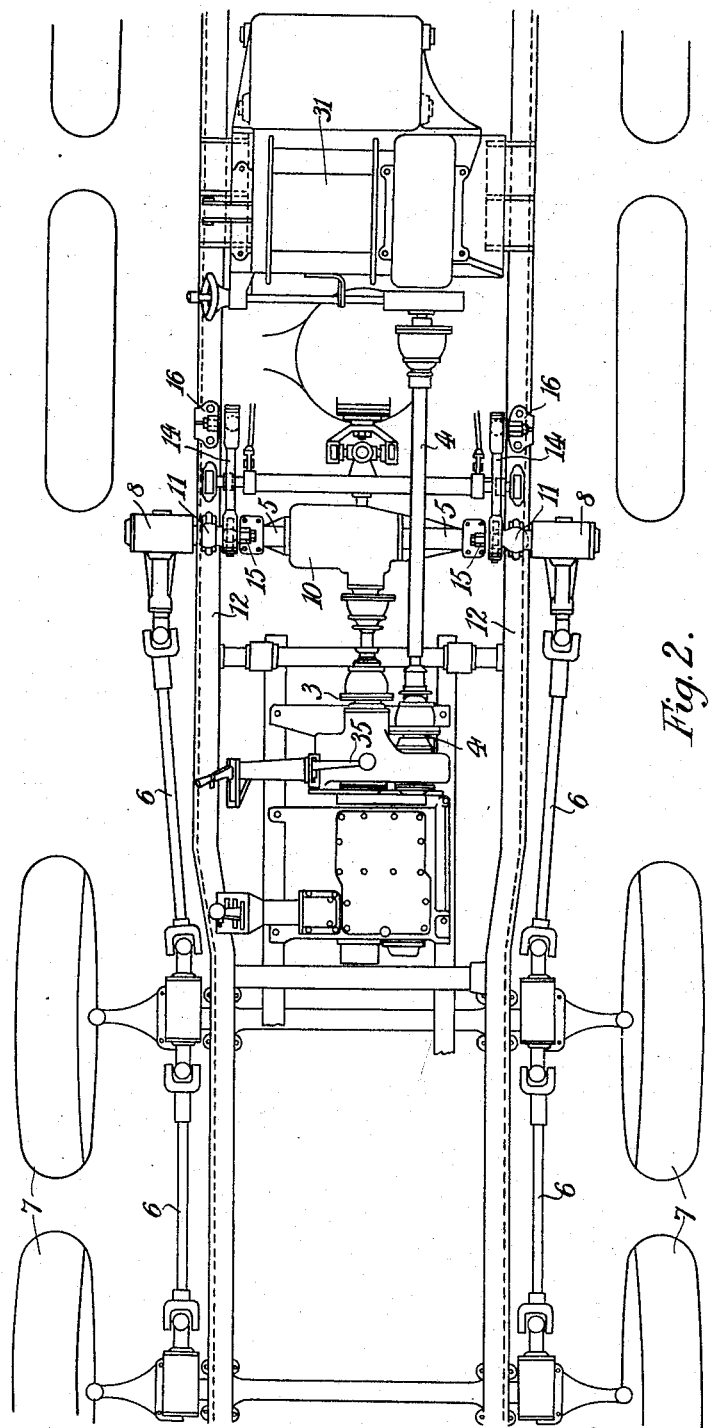

According to the specific layout shown in Figures 1 and 2 a gear giving the aforesaid changes of drive includes three principal shafts of which 2 gives the rear drive, 3 the front drive and 4 the power take-off.

The rear drive may either be centrally disposed, as shown, or transmitted in the same way as hereinafter described with reference to the front drive i. e. by means of a cross-shaft and side shafts, in which case the cross-shaft would be driven from the shaft 2.

The front drive is preferably transmitted by means of a cross-shaft 5 driven off the shaft 3 to side shafts 6 which run forward along each side of the main frame to the front road wheel or wheels 7. The cross-shaft 5 drives the side shafts 6 by means of worm or other appropriate gear 8, whilst the drive between the side shafts and the front road wheel or wheels may be transmitted by means of short universally jointed and outwardly directed shafts which may either carry a spur pinion meshing with a spur wheel on the road wheel or may pass centrally through the hub of the latter and carry a driving plate which is attached to the outer end of the said hub. A differential gear 9 may, as shown in Figure 3, be incorporated in the cross-shaft and suitable provision made to relieve such shaft from any stresses due to distortion of the main frame of the chassis. For example, the cross-shaft 5 may be enclosed in a casing 10 which is mounted at each end in spherical bearings 11 carried by the longitudinal frame members 12 of the vehicle. At one end of the casing the ball 13 of the spherical bearing is fixed or made integral therewith but at the other end the ball 13$^a$ is mounted loosely on the casing so as to allow for endwise movement of the ball on the casing consequent upon any distortion of the main frame of the chassis affecting the distance between the two spherical bearings.

Torque reaction on the rigid casing can be provided for by means of a torque rod 14 the ends of which are pivotally connected to brackets 15, 16 on the said casing and the longitudinal frame member 12 respectively.

The manner in which, according to this invention, the several shafts 2, 3 and 4 derive their motion from the engine and the manner in which they can be used separately or in combination with each other will be better understood by referring to Figure 5, where it will be seen that the first or rear-drive shaft 2 is driven direct from the main-shaft 18 of the variable speed gear, or from an auxiliary variable speed gear, in which latter case it is normally disconnected therefrom and adapted to be coupled thereto by the operation of a separate or auxiliary gear lever which moves a sliding gear 19 on the rear drive shaft into mesh with a gear member 20 on the said main shaft. The said first or rear drive shaft 2 also carries a second sliding gear member 21 which is in constant mesh with an idle shaft 22 carrying two gear members 23, 24 of which 23 is in constant mesh with one member 25 of a double pinion 26 slidably arranged upon the second shaft 3 of the change-drive gear and is of substantial width.

Assuming the first shaft 2 of the change-drive gear to be coupled to the main shaft 18 of the variable speed gear, the rear drive is obtained by moving the second sliding gear member 21 on the said first shaft into mesh with a gear member 27 on the main transmission. If now a greater tractive effort is for any reason required, the power available at the first shaft 2 can be divided between the rear transmission and a front transmission so that the vehicle drives by both front and rear wheels. For this purpose, the double pinion 26 on the second or front drive shaft 3 is slid along the latter to bring the member 25 thereof, which is cut with internal teeth 25$^a$ and is in constant mesh with the gear 23 keyed to the idle shaft 22 into mesh with a gear 28 on the front drive transmission, the position of the gears giving the rear drive remaining unchanged, so that the power is now distributed between the front and rear driving wheels. If now it is desired to disconnect the rear drive and to leave the vehicle front driven, all that is necessary is to return the second sliding gear member 21 on the first or rear driving shaft 2 back to its inoperative position out of driving connection with the rear transmission when the whole of the available power is transmitted to and by the second or front drive shaft 3.

The third shaft or power take-off 4, can be driven either when the vehicle is stationary or in motion. In the former case the second sliding gear 21 on the first or rear drive shaft 2 and the sliding double pinion 26 on the second or front drive shaft 3 are both disconnected from their respective transmissions. The double pinion 26 is then moved further in the left-hand direction so as to bring the other member 29 thereof into mesh with a gear 30 on the third shaft or power take-off 4, when the whole power of the engine at the varying speeds provided by the change speed gear is available for operating a winch 31 or for other purposes.

Where the circumstances are such that it would be an advantage to be able to use the power take-off whilst the vehicle is moving forward this can be done, in combination with the rear drive, by simply moving the second sliding gear member 21 on the first or rear drive shaft 2 into mesh with the gear member 27 on the main or rear transmission when the power will be divided between the power take-off and the rear drive.

Figure 7:
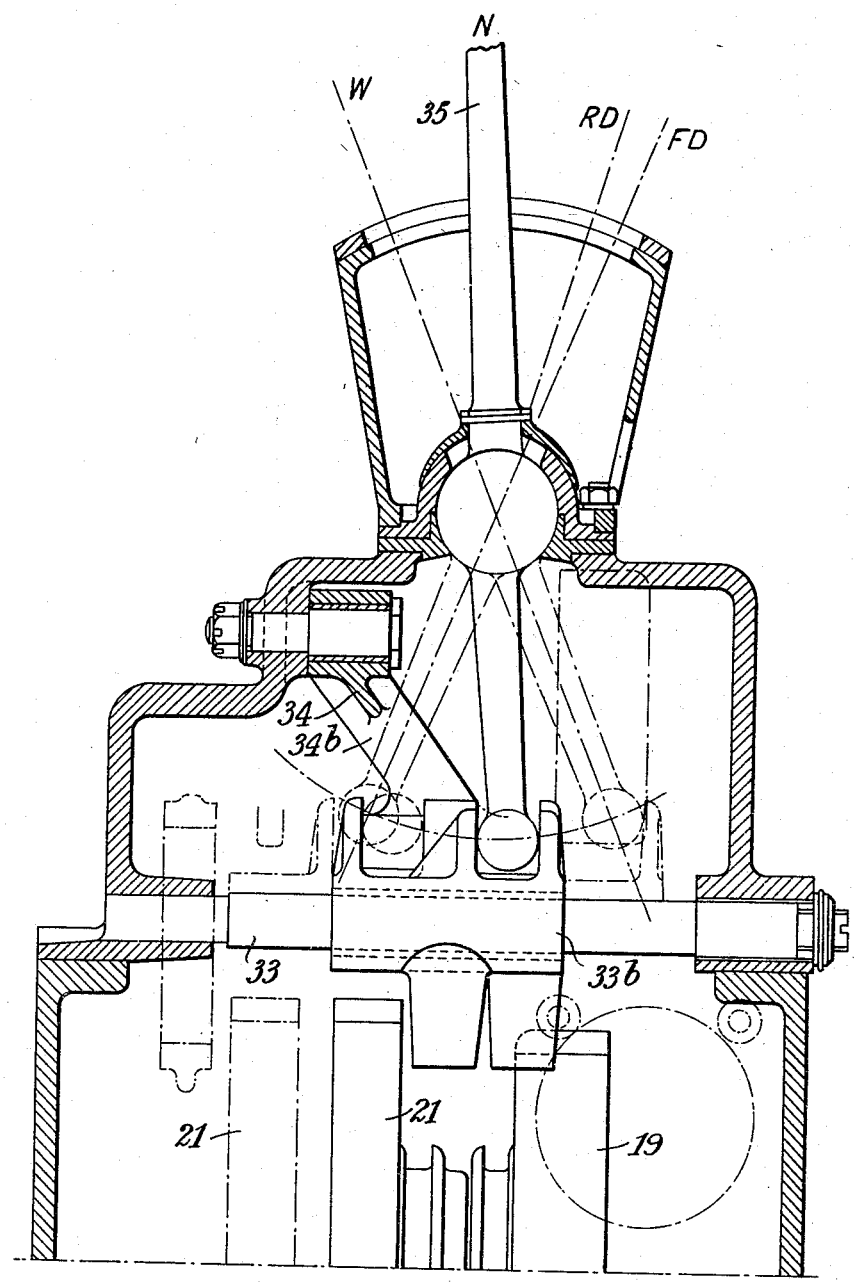
Figure 7 is another view of the striking mechanism taken at right angles to Figure 6.

The above described movements of the various gear members can be brought about by the operation of a single lever moving in a gate of appropriate shape, in combination with duplex selector mechanism and a locking device. Referring to Figures 6 and 7, each of the two selector shafts 32, 33 carries a striking fork 32$^a$, 33$^a$ having a double slotted boss 32$^b$, 33$^b$. Fork 32$^a$ operates the second sliding gear member 21 on the first or rear drive shaft 2, whilst the fork 33$^a$ engages the sliding double pinion 26 on the second or front drive shaft 3.

The locking device consists of a rocking fork 34, the limbs 34$^a$, 34$^b$ of which are each provided with a pair of projections adapted to engage the slots in the bosses 32$^b$, 33$^b$ of the two striking forks.

The arrangement of the change-drive operating mechanism is such that when changing from neutral to the rear drive only, the change-drive gear lever 35 is moved from the neutral position marked N in the gate, Figure 8, to the position marked RD, in which position its inner end engages one of the slots in the boss 32$^b$ of the fork operating the second sliding gear member 21 on the first or rear drive shaft 2 and in doing so pushes out of previous engagement therewith the limb 34ª of the locking fork 34 thereby causing the other limb 34ᵇ to enter further into engagement with the slots in the boss of the other striking fork 33ª and holding it in the neutral position.

In order to obtain the front drive and at the same time to retain the rear drive the change-drive gear lever 35 is then moved across the gate to the position marked F. R. so as to come into engagement with the slots in the boss 33ᵇ of the second or front drive striking fork 33ª. In doing this it pushes out of engagement therewith the limb 34ª of the locking fork and thereby causes the other limb 34ᵇ of the latter to engage the boss 32ᵇ of the first or rear drive striking fork, thus locking the latter in its operative position. To change from neutral to the power take-off the change-drive lever 35 is moved from the position N across the gate into engagement with the second or front drive striking fork 33ª and then into the position marked W, i. e. in a direction opposite to that required to give the front drive, which brings the double pinion 26 on the second shaft 3 of the gear into mesh with the gear member 30 on the third shaft or power take-off 4, and at the same time causes the locking fork 34 to engage the first striking fork 32ª to retain it in the neutral position. If it is desired to use the power take-off whilst the vehicle is being driven forward from the rear, the change-drive gear lever 35 after having been moved to position R. D. to put in the rear drive in the manner above described, is carried across the gate and then into the position marked R. W. i. e. in an opposite direction to that which would bring in the front drive, so that instead of moving the double pinion 26 in the direction to engage the front drive transmission it is moved into mesh with the gear member 30 on the third shaft or power take-off 4, the locking fork operating to retain the rear drive.

When it is desired to drive by the front wheels only the gear lever 35 is moved from the neutral position N across the gate and then in a direction opposite to that which gives the power take-off, i. e. in the left-hand direction to the position F. D. In this position the internal teeth 25ª on the member 25 of the double pinion 26 are caused to mesh with the gear member 28 on the front drive transmission, the locking fork operating to keep the sliding gear 21 on the rear drive shaft 2 out of engagement with the gear member 27 on the rear transmission.

Where the vehicle is provided with a plurality of front or rear driving wheels the principle of the invention can be logically extended so as to enable the driver to drive the vehicle by any one or more of the front wheels or any one or more of the rear wheels or by various combinations of front and rear wheels. In such a case the shafts 2 and 3 may each form the main shaft of a supplementary change-drive or power distribution gear.

I claim:—

1. In motor vehicles having a plurality of pairs of road wheels capable of being driven, the combination of a variable speed gear, a power distribution gear, a front transmission comprising a cross-shaft and a longitudinal shaft at each side of the vehicle, a rear transmission, a power take-off, and a single gear lever for connecting and disconnecting either the front transmission, the rear transmission or the power take-off or any two of these mechanisms with the motor through the variable speed and power distribution gears.

2. In motor vehicles, the combination of a motor and a power transmission gear comprising a longitudinal shaft at each side of the vehicle, a cross-shaft in operative driven connection with said motor and in operative driving connection with said longitudinal shafts, and a rigid casing enclosing said cross-shaft, said casing being mounted at each end in spherical bearings carried by the vehicle frame and being free to move axially relatively to one of said bearings.

3. In motor vehicles having a plurality of pairs of road wheels capable of being driven and means whereby the power available at the motor shaft can be utilized at will for driving any of said pairs of wheels, a transmission gear comprising a longitudinal shaft at each side of the vehicle, a cross-shaft in operative driven connection with said motor and in operative driving connection with said longitudinal shafts, and a rigid casing enclosing said cross-shaft, said casing being mounted at each end in spherical bearings carried by the vehicle frame and being free to move axially relatively to one of said bearings.

4. In motor vehicles having a variable speed gear, rear transmission, a front transmission and a power take-off, the combination of a rear drive shaft carrying a pair of sliding gears adapted for engagement with the variable speed gear and with the rear transmission respectively, a front drive shaft carrying a sliding double gear adapted for engagement with the front transmission and the power take-off respectively, an idle shaft carrying a pair of fixed gears in permanent engagement respectively with the sliding gears which are severally adapted for engagement with the rear and front transmissions and means for moving said sliding gears along their respective shafts.

5. In motor vehicles having a plurality of driving axles, a power take-off and a speed gear, means controlled by a single lever in combination with duplex selector mechanism and a locking device whereby the power available at the motor shaft at the varying rates of speed provided by the variable speed gear can be utilized at will for driving the power take-off simultaneously with certain of said driving axles.

In testimony whereof, I have signed my name to this specification at Wolverhampton, England, this 5th day of June 1930.

SYDNEY SLATER GUY.